United States Patent [19]
Shinzawa et al.

[11] Patent Number: 5,855,854
[45] Date of Patent: Jan. 5, 1999

[54] OXIDATION CATALYST FOR DIESEL ENGINE

[75] Inventors: Motohiro Shinzawa, Yokosuka; Yasuyuki Murofushi, Yokohama, both of Japan

[73] Assignee: Nissan Motor Co., Ltd., Kanagawa, Japan

[21] Appl. No.: 744,662

[22] Filed: Nov. 6, 1996

[30] Foreign Application Priority Data

Nov. 7, 1995 [JP] Japan ................................ 7-288793

[51] Int. Cl.$^6$ .................................................. B01D 53/34
[52] U.S. Cl. ........................ 422/177; 422/171; 422/180; 422/211; 422/222; 55/DIG. 30
[58] Field of Search ..................... 422/177, 190, 422/180, 171, 211, 222; 502/527, 439; 60/299, 301; 55/DIG. 30; 428/116, 593, 594

[56] References Cited

U.S. PATENT DOCUMENTS

| | | | |
|---|---|---|---|
| 3,503,715 | 3/1970 | Haensel | 422/171 |
| 5,108,716 | 4/1992 | Nishitawa | 422/177 |
| 5,264,186 | 11/1993 | Harada et al. | 422/171 |

OTHER PUBLICATIONS

"Oxidation Catalyst in Corolla Diesel for Germany," *Toyota Technical Review*, vol. 43, No. 1, May 1993, pp. 106–112.

*Primary Examiner*—Hien Tran
*Attorney, Agent, or Firm*—McDermott, Will & Emery

[57] ABSTRACT

An oxidizing catalytic converter is provided in an exhaust passage of a diesel engine. A catalyst is formed by coating a wash coat comprising platinum onto a substrate The converter is divided into a high temperature part through which high temperature exhaust is circulated and a low temperature part through which low temperature exhaust is circulated, and the platinum particle diameter of the catalyst in the low temperature part is arranged to be less than that in the high temperature part. It is preferable that the wash coat amount of the low temperature part is less than that of the high temperature part. It is moreover preferable that the platinum amount in the low temperature part is greater than that in the high temperature part. In this way, the soluble organic fraction, hydrocarbons and carbon monoxide are effectively and continuously purged from the exhaust.

11 Claims, 19 Drawing Sheets

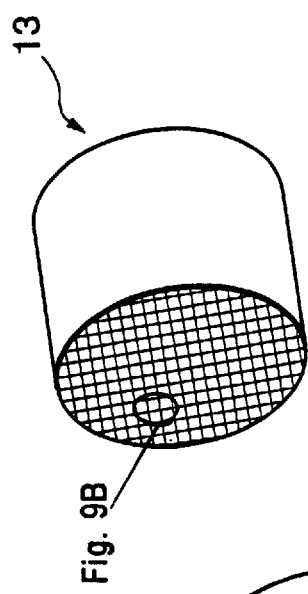
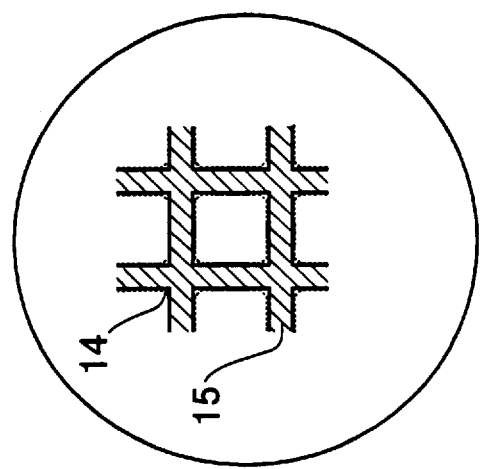
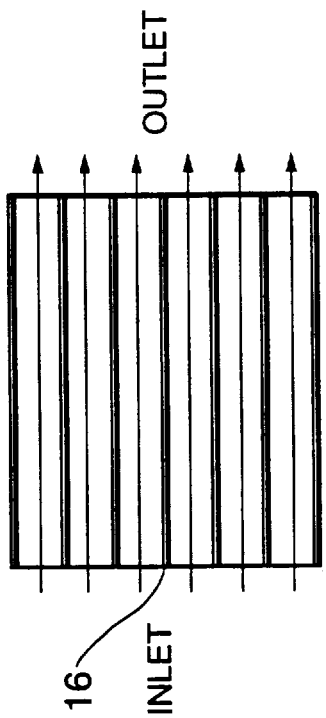
FIG.9A PRIOR ART
FIG.9B PRIOR ART
FIG.9C PRIOR ART

OXIDATION CATALYST FOR DIESEL ENGINE

FIELD OF THE INVENTION

This invention relates to an oxidation catalyst for a diesel engine, and in particular, to an oxidation catalyst which removes the soluble organic fraction, hydrocarbons and carbon monoxide from particulate matter in exhaust using platinum as a catalyst.

BACKGROUND OF THE INVENTION

The installation of an oxidation catalyst in an exhaust passage to purify the soluble organic fraction (SOF), hydrocarbons (HC) and carbon monoxide (CO) from particulate matter (PM) in the exhaust of a diesel engine, is disclosed in for example the Toyota Technical Review Vol. 43, No. 1 published in May, 1993.

FIGS. 9A–9C show one example of such a diesel engine oxidation catalyst 13. The catalyst 13 comprises a honeycomb type substrate 14 of cordylite, and a wash coat 15 supported on the substrate 14, as shown in FIGS. 9A and 9B. The wash coat 15 comprises an alumina ($Al_2O_3$) base material, and platinum (Pt) or palladium (Pd) adsorbed on the base material. The substrate 14 and wash coat 15 comprise a plurality of longitudinal partitions 16 as shown in FIG. 9C, and exhaust gas passes through spaces enclosed by these partitions 16.

The main components of PM are oil in fuel, SOF due to unburnt fuel, dry soot produced by dehydration of fuel, and sulfate ($SO_4$) due to sulfur in fuel. The dry soot and sulfates comprise an insoluble organic fraction (ISF).

The proportions of these components vary according to the engine combustion system. In the case of a precombustion chamber type diesel engine:

SOF=10–40%, dry soot=60–90%, sulfates=1–3%.

In the case of a direct injection type diesel engine:

SOF=30–60%, dry soot=40–70%, sulfates=1–3%.

The performance of an oxidation catalyst varies according to the catalyst inlet temperature, as shown in FIGS. 11A–11C. A Pt type oxidation catalyst has a high oxidizing activity for HC as shown in FIG. 11A, but the same is true for SO2. Therefore, when the exhaust temperature is high, sulfates which are oxidation products of $SO_2$ are produced in large quantity as shown in FIG. 11C, and the decrease of PM at high temperature is consequently lessened as shown in FIG. 11B.

A Pd type catalyst, on the other hand, has a low oxidizing activity for HC and $SO_2$. Hence, even when the temperature increases, not much sulfate is produced as shown in FIG. 11C, and the reduction of PM due to decrease of SOF is therefore maintained even at high temperature. These catalysts reduce PM and SOF even at exhaust temperatures where oxidizing activity is low, as shown in FIG. 11B, but this is due to the fact that PM and SOF are adsorbed on the catalyst and build up on it.

FIGS. 12A and 12B compare a Pt type oxidation catalyst with a Pd type oxidation catalyst regarding the amount of dry soot and SOF which are adsorbed or built up on the catalyst when the exhaust temperature conditions are varied.

When using a Pt type oxidation catalyst, at the exhaust temperature of 200° C. or higher, the amount of dry soot built up decreases, and at 300° C. or higher, there is almost no build-up. Using a Pd type oxidation catalyst on the other hand, since its oxidizing activity is low, dry soot build-up begins to decrease only at 300° C. or higher. SOF adsorption also depends on the exhaust temperature, but not on whether the catalyst has high or low activity, and at 200° C. or over, there is practically no SOF adsorption on the catalyst. This is due to the fact that SOF vaporize at 200° C. or higher temperatures.

FIG. 13 shows a conversion rate with respect to temperature of a Pt type oxidation catalyst on which PM (SOF) has been adsorbed or built up at a low exhaust temperature at which the catalyst has a low oxidizing activity. It is seen from this figure that adsorption or build-up of PM (SOF) largely decreases oxidizing activity relative to HC and CO. When the temperature reaches 200° C. and over, CO is converted since SOF which had been adsorbed or built up is vaporized and released from the catalyst. When the temperature reaches approximately 280° C., SOF which had been adsorbed or built up suddenly burns, restoring the oxidizing activity of the catalyst with respect to HC and CO. Hence, catalyst performance relative to each component is largely affected by the exhaust temperature.

FIG. 14 shows an exhaust temperature frequency in the 10/15 running mode of a vehicle carrying a direct injection type diesel engine. It is seen that the time required to reach the oxidizing activity temperature is less at the downstream under-floor position than in the upstream exhaust manifold position.

FIG. 15A shows the relation between the capacity of a Pt type oxidation catalyst and PM adsorption/build-up performance at an exhaust temperature of 150° C. where the oxidizing activity is low. FIG. 15B shows this relation in more detail. FIGS. 16A and 16B are similar graphs but showing a PM oxidation performance at an exhaust temperature of 250° C.

From these graphs, it is seen that PM adsorption/build-up performance increases the higher the catalyst capacity. It is also seen that although oxidizing activity increases to some extent with increase of catalyst capacity, it is steady above a certain capacity.

FIG. 17A is a graph showing the relation between catalyst capacity and rate of sulfate increase for a conventional Pt type oxidation catalyst. FIG. 17B shows sulfate increase rate characteristics when space velocity (SV) is varied for a Pt type oxidation catalyst. As the space velocity increases for the same exhaust flowrate if the catalyst capacity is kept low, increase of sulfate can be suppressed. In practice however, a certain catalyst capacity is required to enhance HC and CO oxidizing activity, hence the oxidizing activity and sulfate suppression performance are in a mutually conflicting relationship with one another.

Oxidation catalysts for diesel engines therefore have the above characteristics. In view of the need to satisfy the aforesaid conflicting demands of high oxidizing activity with respect to HC and CO, and suppression of sulfate, and in view of the difference of temperature and capacity between upstream and downstream, conventional oxidation catalysts for diesel engines therefore comprised for example a Pd type catalyst having a low oxidation activity and a separate Pt type catalyst of low capacity, i.e. having a high space velocity, installed in the upstream part of the exhaust.

This construction however fails to adequately resolve the following issues:

1. Even when the Pt catalyst is of low capacity, it produces a large amount of sulfate.
2. As the Pd catalyst has a low oxidizing activity, it has only a low effect in reducing HC and CO.
3. Catalyst performance cannot be maintained due to PM build up.

SUMMARY OF THE INVENTION

It is therefore an object of this invention to effectively and continuously purify soluble organic fraction, hydrocarbons and carbon monoxide contained in particulate matter in the exhaust of a diesel engine.

It is a further object of this invention to control adsorption or build-up of exhaust particulate matter on a catalyst.

In order to achieve the above objects, this invention provides an oxidizing catalytic converter installed in an exhaust passage of a diesel engine. The converter comprises a catalyst formed by coating a wash coat comprising platinum particles onto a substrate. The catalyst comprises a high temperature part through which high temperature exhaust is circulated and a low temperature part through which low temperature exhaust is circulated, wherein a platinum particle diameter of the catalyst in the low temperature part is less than a platinum particle diameter of the catalyst in the high temperature part.

It is preferable that the diameter of the platinum particle of the catalyst in the low temperature part is 2–4 nm and the diameter of the platinum particle of the catalyst in the high temperature part is approximately 20 nm.

It is also preferable that an amount of the wash coat per unit catalyst volume in the low temperature part is set less than an amount of the washcoat per unit catalyst volume in the high temperature part.

It is further preferable that an amount of the wash coat per unit catalyst volume in the low temperature part is 10–30 g/l and an amount of the washcoat per unit catalyst volume in the high temperature part is 120–160 g/l.

It is also preferable that a platinum particle amount per unit catalyst volume in the low temperature part is set larger than a platinum particle amount per unit catalyst volume in the high temperature part.

It is further preferable that the platinum particle amount per unit catalyst volume in the low temperature part is 1.6–2.0 g/l, and the platinum particle amount per unit catalyst volume in the high temperature part is 1.2–1.6 g/l.

It is also preferable that the high temperature part is situated upstream of the exhaust passage relative to the low temperature part.

It is further preferable that the high temperature part and the low temperature part are disposed in series in one case.

It is also preferable that the converter is formed in the shape of an envelope. The high temperature part is disposed in the vicinity of the center of the converter, and the low temperature part is disposed in the periphery of the high temperature part.

It is also preferable that the exhaust passage comprises a first branch and a second branch. The high temperature part is provided in the second branch and the low temperature part is provided in the first branch. A shutoff valve which opens only when the exhaust temperature is low is provided in the first branch.

It is also preferable that the high temperature part and the low temperature part respectively comprise a plurality of cells formed by the catalyst, and the number of cells in the low temperature part is greater than the number of cells in the high temperature part.

The details as well as other features and advantages of this invention are set forth in the remainder of the specification and are shown in the accompanying drawings.

BRIEF DESCRIPTION OF THE DRAWINGS

FIGS. 9A–9C are a perspective view of a prior art oxidation catalyst converter, a view in section showing an enlargement of an essential part of same, and a vertical section of the converter.

DETAILED DESCRIPTION OF THE INVENTION

Before describing embodiments of the invention, an account will be given of some facts discovered by the inventor in the course of experiment.

Figure 18:
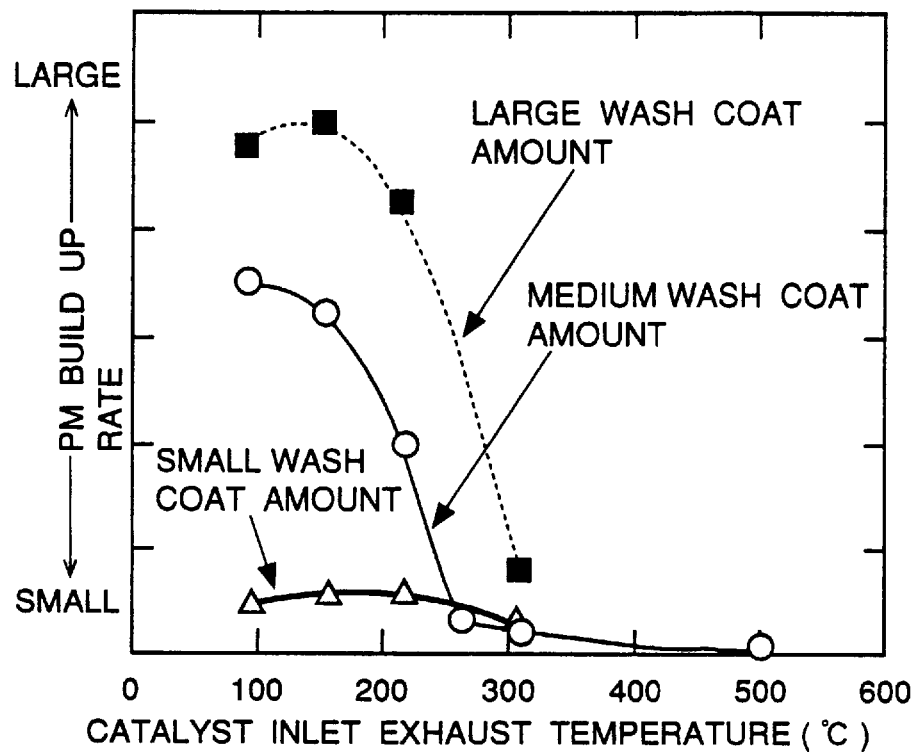
FIG. 18 is a graph showing relations of a PM build-up rate in a Pt type oxidation catalyst, exhaust temperature at a converter inlet, and wash coat amount.

In a Pt type oxidation catalyst, a relation between build-up rate of PM (SOF) within a predetermined time and an exhaust temperature at a converter inlet, varies according to an amount of an alumina ($Al_2O_3$) wash coat supported on a substrate, as shown in FIG. 18. In other words, the PM build-up rate depends on the wash coat amount. The lower the temperature and the higher the wash coat amount, the faster the PM build-up rate, i.e., the more PM (SOF) builds up.

Figure 19:
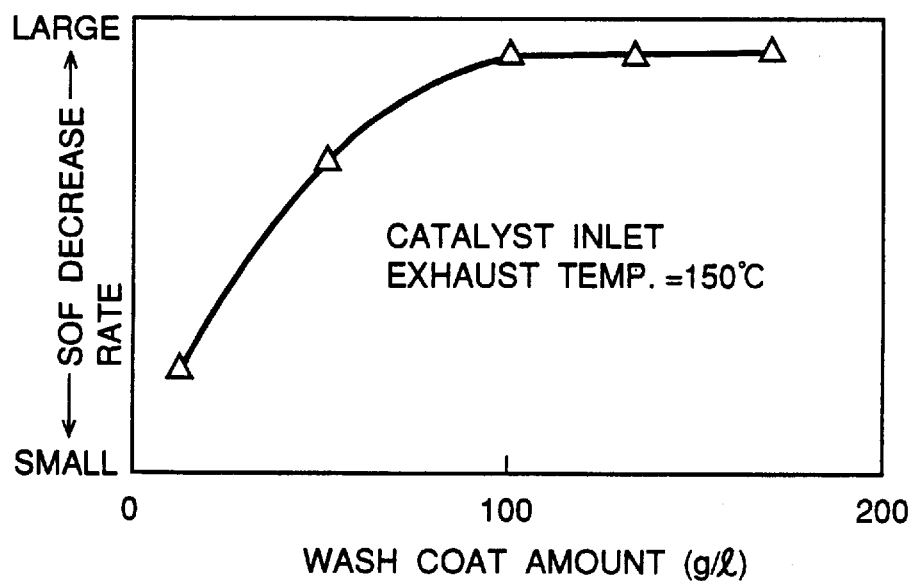
FIG. 19 is a graph showing a relation of a wash coat amount and a SOF decrease effect due to adsorption at an exhaust temperature of 150° C. at a converter inlet of a Pt type oxidation catalyst.

The relation between wash coat amount and SOF decrease due to adsorption on the catalyst at an exhaust temperature of 150° C. at which the oxidizing activity of a Pt type catalyst is low, is shown in FIG. 19. According to this figure, SOF decrease is steady at a wash coat amount of approximately 100 g/l or more.

Figure 20:
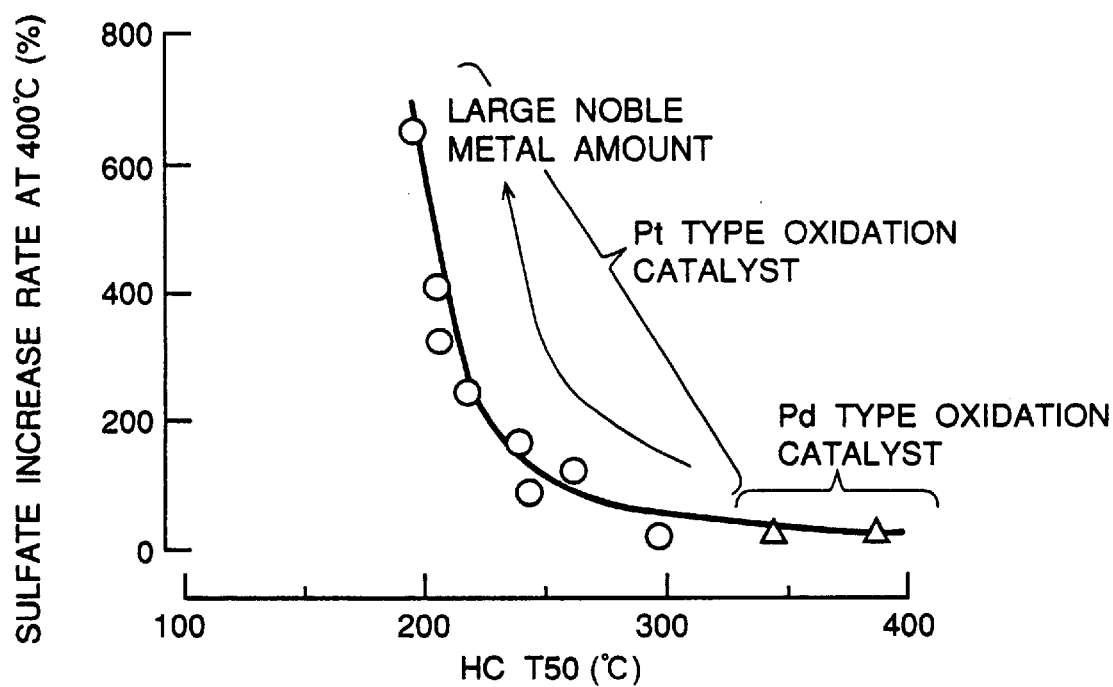
FIG. 20 is a graph showing relations of a catalyst metal amount, catalyst oxidizing activity and sulfate increase rate in an oxidation catalyst.
Figure 21A:
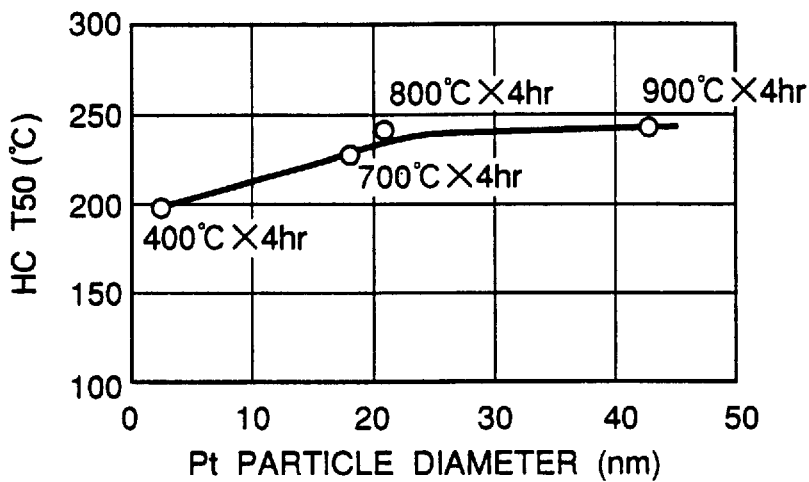
FIGS. 21A, 21B are graphs showing relations of oxidizing activity and sulfate increase rate relative to Pt particle diameter in a Pt type oxidation catalyst.
Figure 21B:
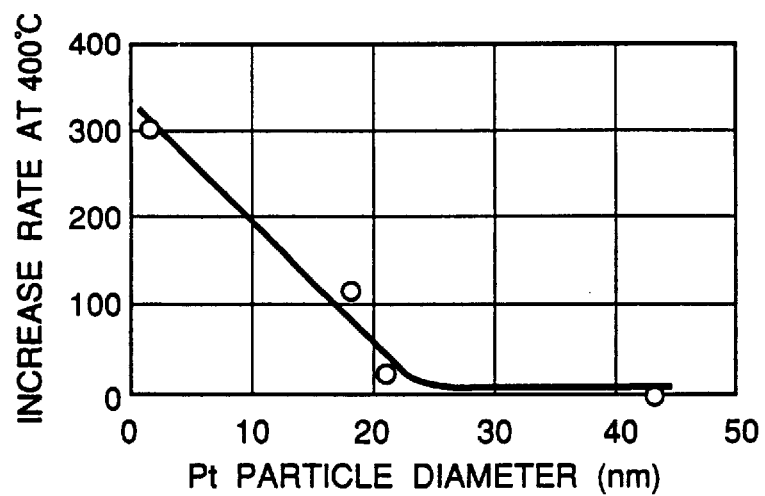

Relations between a catalyst metal support amount, oxidizing activity (HC T50) and sulfate increase rate are shown in FIG. 20. In a Pt type oxidation catalyst, oxidizing activity improves the higher the support amount of the noble metal, but the sulfate increase rate also increases. Further in a Pt type oxidation catalyst, the differences shown in FIG. 21A between Pt particle diameter and oxidizing activity (HC T50) emerge due to differences of calcination temperature during manufacture.

When the calcination temperature is raised, the Pt particle diameter increases, and at 800° C., it is approximately 20 nm. Up to this temperature, oxidizing activity tends to decrease with rise of calcination temperature, but at this temperature and above the activity is stable. Also as the Pt particle diameter increases, to amount of sulfate production sharply decreases. The reason why sulfate production can be suppressed by controlling particle diameter is due to the fact that sulfate production is a structure-sensitive reaction. For this type of reaction, reaction rate and selectivity are markedly dependent on particle diameter. When the angles and corners of the Pt particles are the main reaction sites, the reaction sites sharply decrease as particle diameter increases, hence reaction rate and selectivity also decrease.

According to this invention, sulfate production is suppressed while keeping the decline of oxidizing activity to a minimum by controlling Pt particle diameter.

Figure 1:
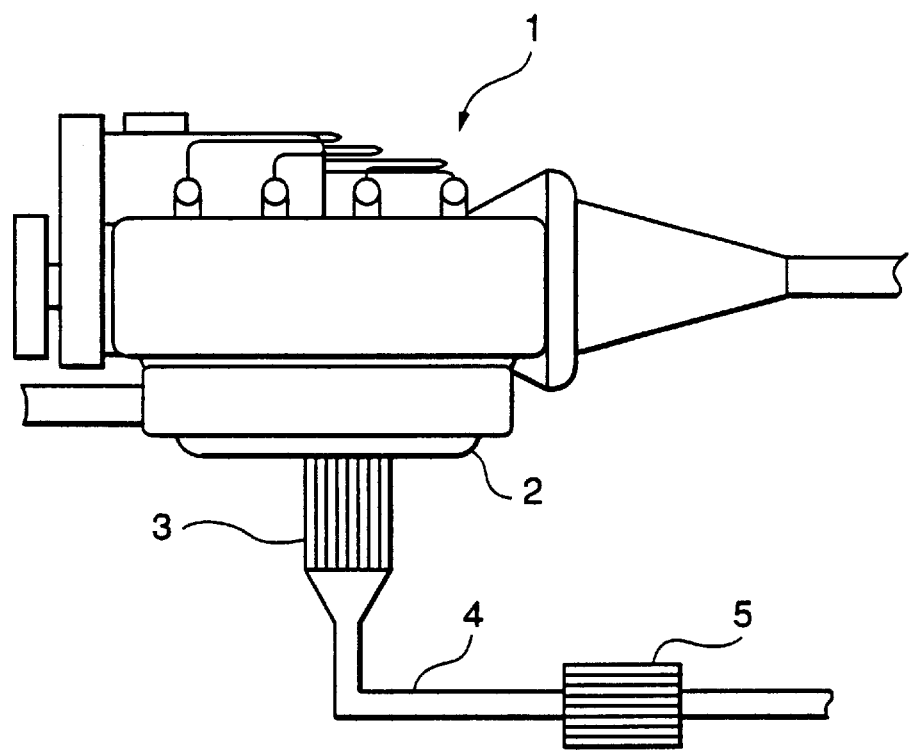
FIG. 1 is a schematic diagram of an oxidizing catalytic converter according to this invention.

Referring to FIG. 1 of the drawings, an exhaust pipe 4 is connected to an exhaust manifold 2 of an automobile diesel engine 1 via an upstream oxidizing catalytic converter 3. The exhaust pipe 4 is installed underneath a floor of an automobile, and a downstream oxidizing catalytic converter 5 is installed midway along its length. The catalytic converter 5 is provided to increase catalytic capacity by enhancing decrease of SOF (PM) due to adsorption on the oxidation catalyst and enhancing decrease of HC, CO and SOF (PM) due to oxidation.

Figure 2:
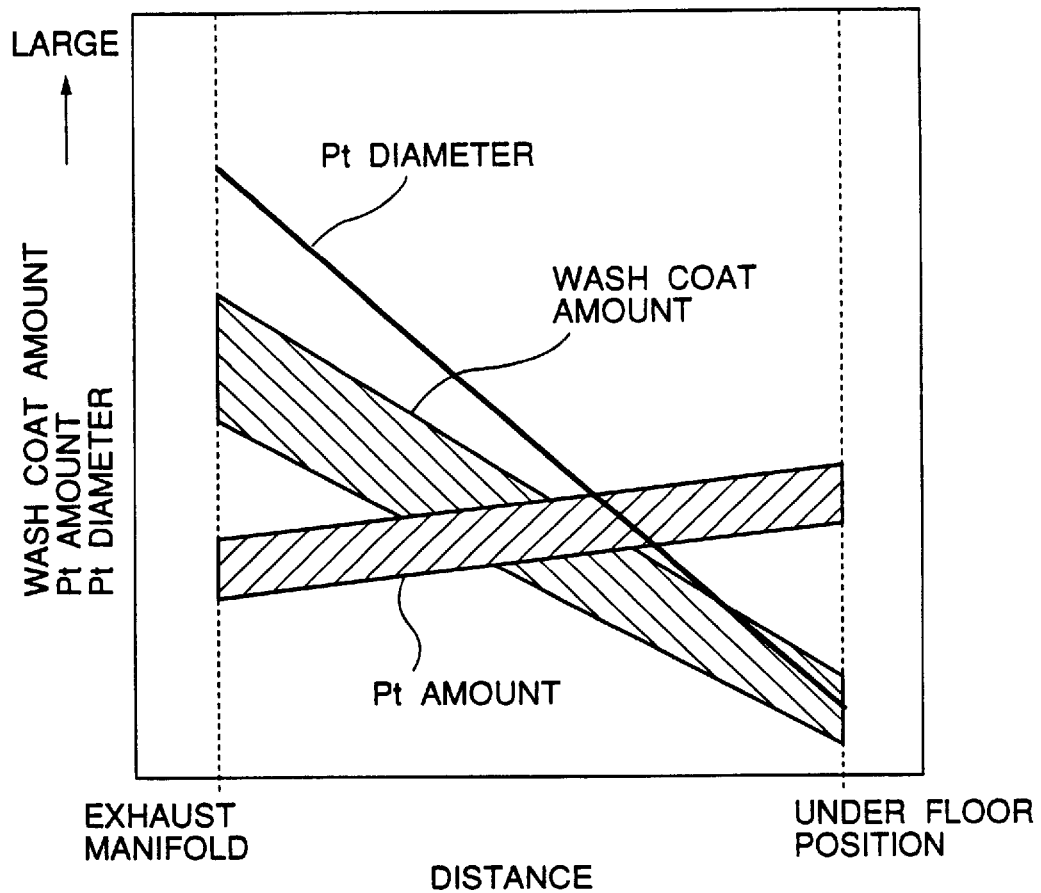
FIG. 2 is a graph expressing a variation of a catalyst in an oxidizing catalytic converter in relation to distance from an exhaust manifold.

The structure of these converters 3 and 5 is shown in FIG. 2. As the exhaust temperature is higher for the oxidation catalyst in the upstream converter 3 near the exhaust manifold 2, adsorbed SOF is more easily vaporized, released and oxidized here, hence deterioration of oxidizing performance due to PM build-up does not tend to occur so much. On the other hand however, sulfate is produced more easily.

Consequently, the Pt diameter is set as large as approximately 20 nm for the catalyst in the upstream converter 3, and the wash coat amount is set high at 120–160 g/l. The Pt amount is set slightly low at 1.2–1.6 g/l.

In this way, SOF is reduced while suppressing production of sulfate in the high temperature region, the total amount of PM is decreased, and the oxidizing activity is maintained at a suitable level as a result.

In the downstream converter 5 situated underneath the floor of the vehicle, exhaust temperature is low, and oxidizing activity of the catalyst tends to fall due to adsorption and build-up of SOF or dry soot on the catalyst. However, sulfate is not easily formed.

The Pt particle diameter of the oxidation catalyst in the downstream converter 5 is therefore set low at 2–4 nm, the wash coat amount is set low at 10–30 g/l, and the Pt amount is set slightly high at 1.6–2.0 g/l. This suppresses adsorption and build-up of SOF or dry soot, and the oxidizing activity in the low temperature region is improved.

Figure 3A:
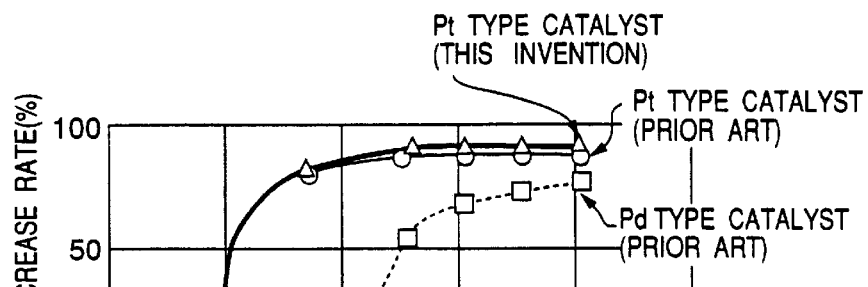
FIGS. 3A–3C are graphs showing variations of HC, SOF, PM and $SO_4$ in an oxidizing catalytic converter in relation to converter inlet exhaust temperature.
Figure 3B:
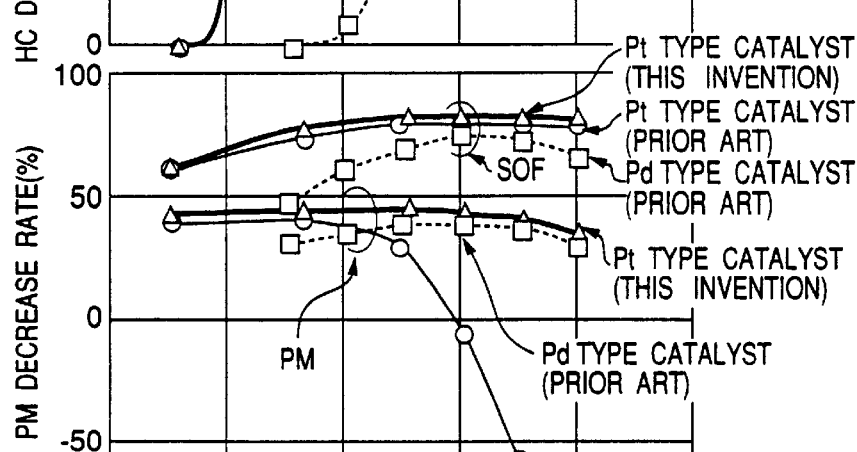
Figure 3C:
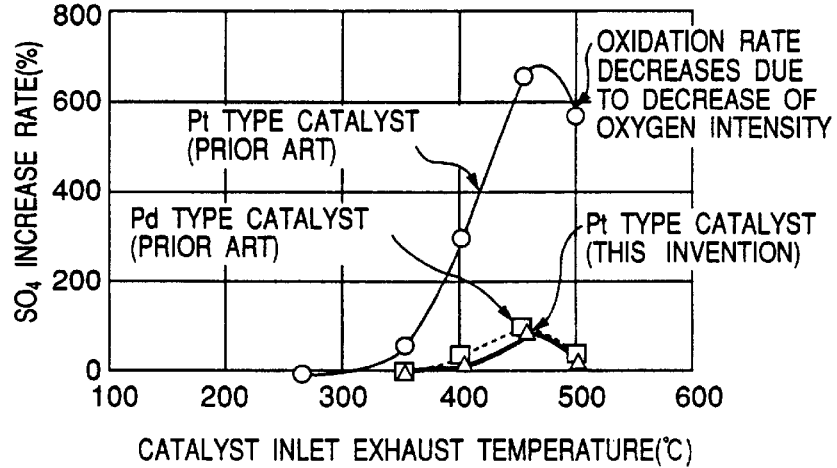
Figure 11A:
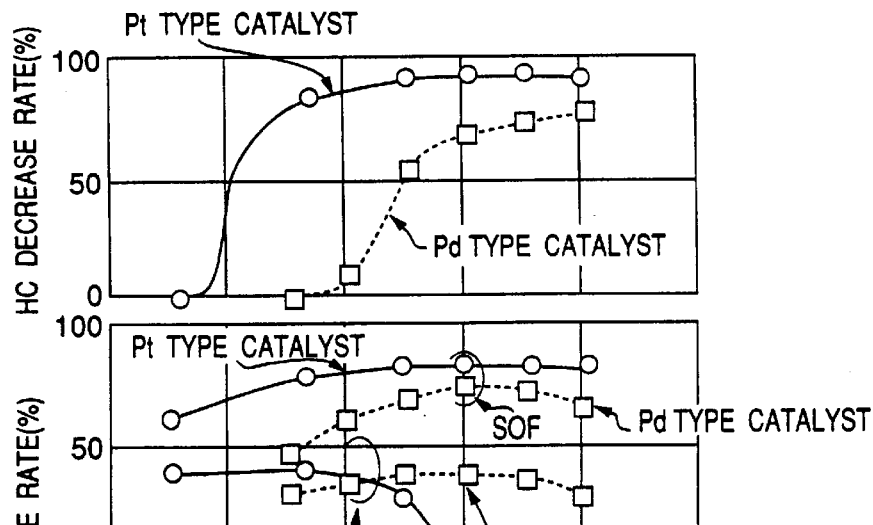
FIGS. 11A–11C are graphs showing relations of HC decrease rate, SOF and PM decrease rate, and $SO_4$ increase rate of an ordinary oxidation catalyst, to converter inlet exhaust temperature.
Figure 11B:
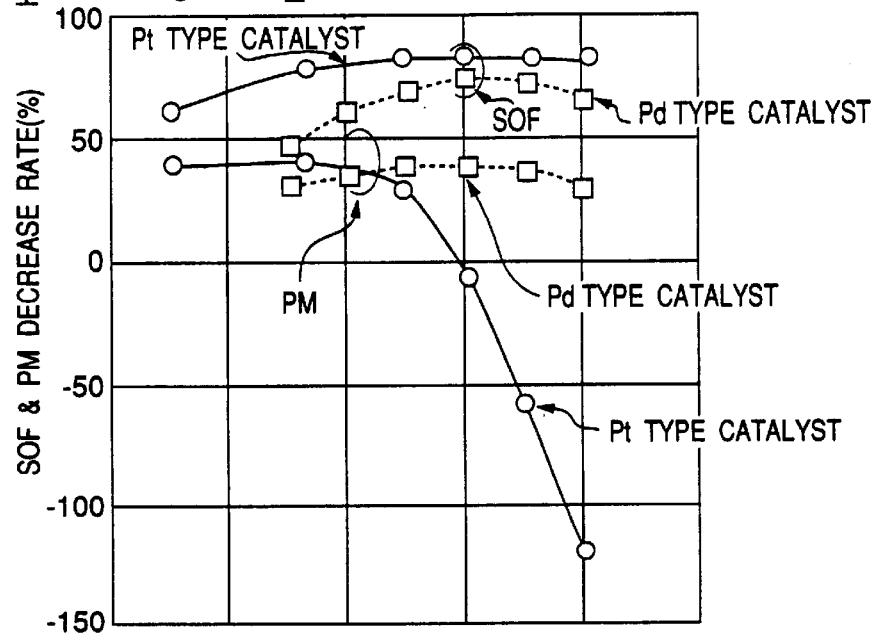
Figure 11C:
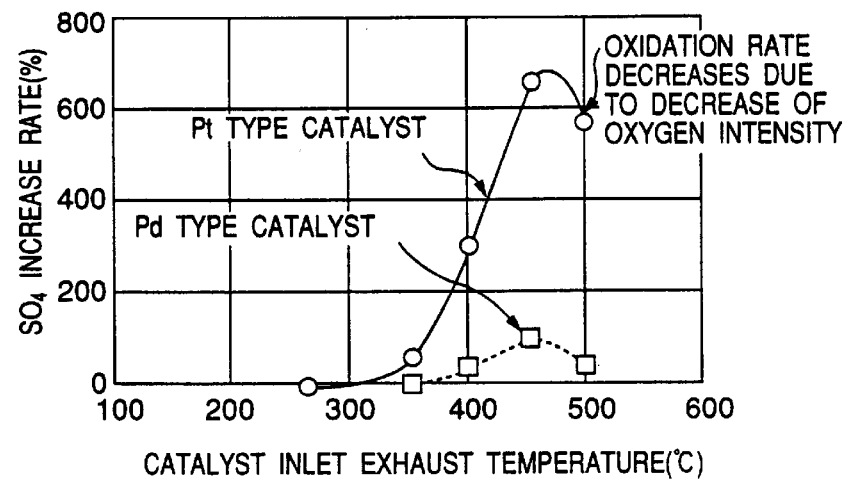
Figure 12A:
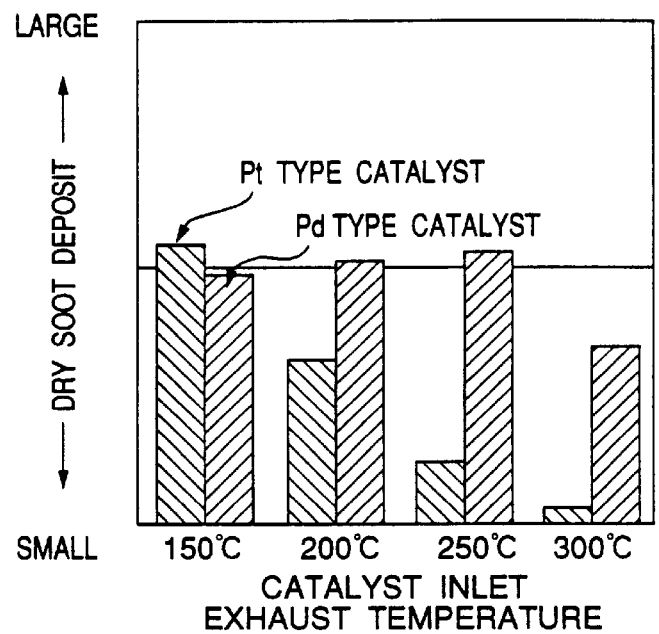
FIGS. 12A, 12B are graphs showing relations of an amount of dry soot build-up and SOF build-up in the ordinary oxidation catalyst, to converter inlet exhaust temperature.
Figure 12B:
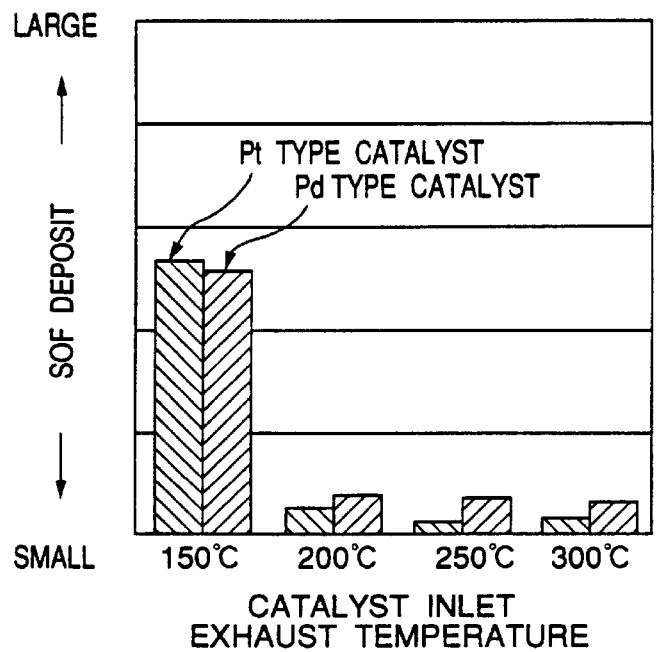
Figure 13:
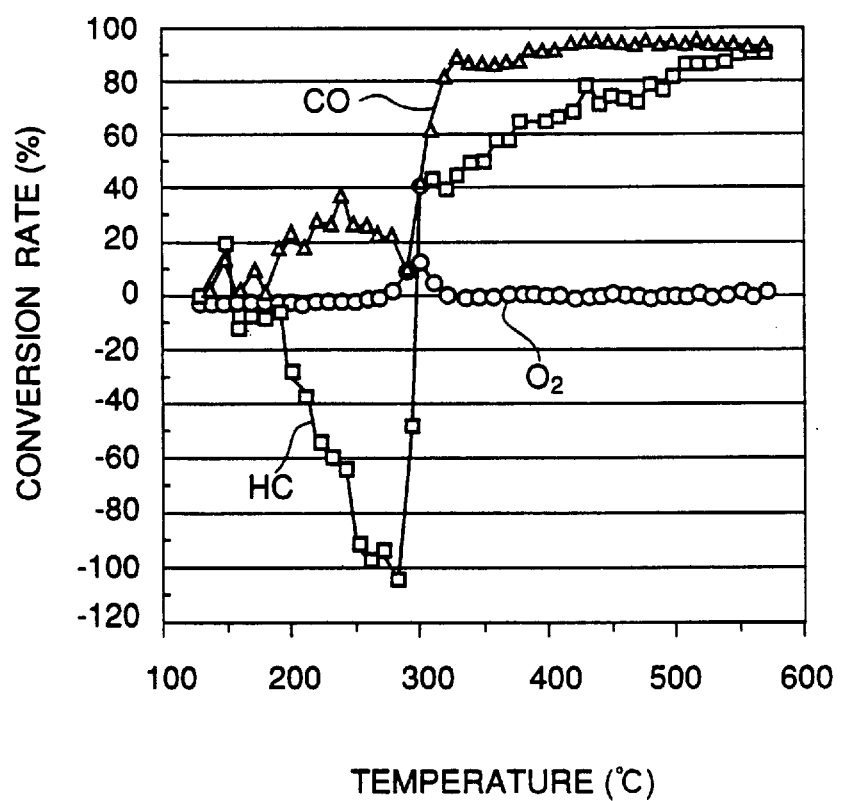
FIG. 13 is a graph showing a relation of oxidizing activity of a Pt type oxidation catalyst when PM has been adsorbed and built up, to exhaust temperature.
Figure 14:
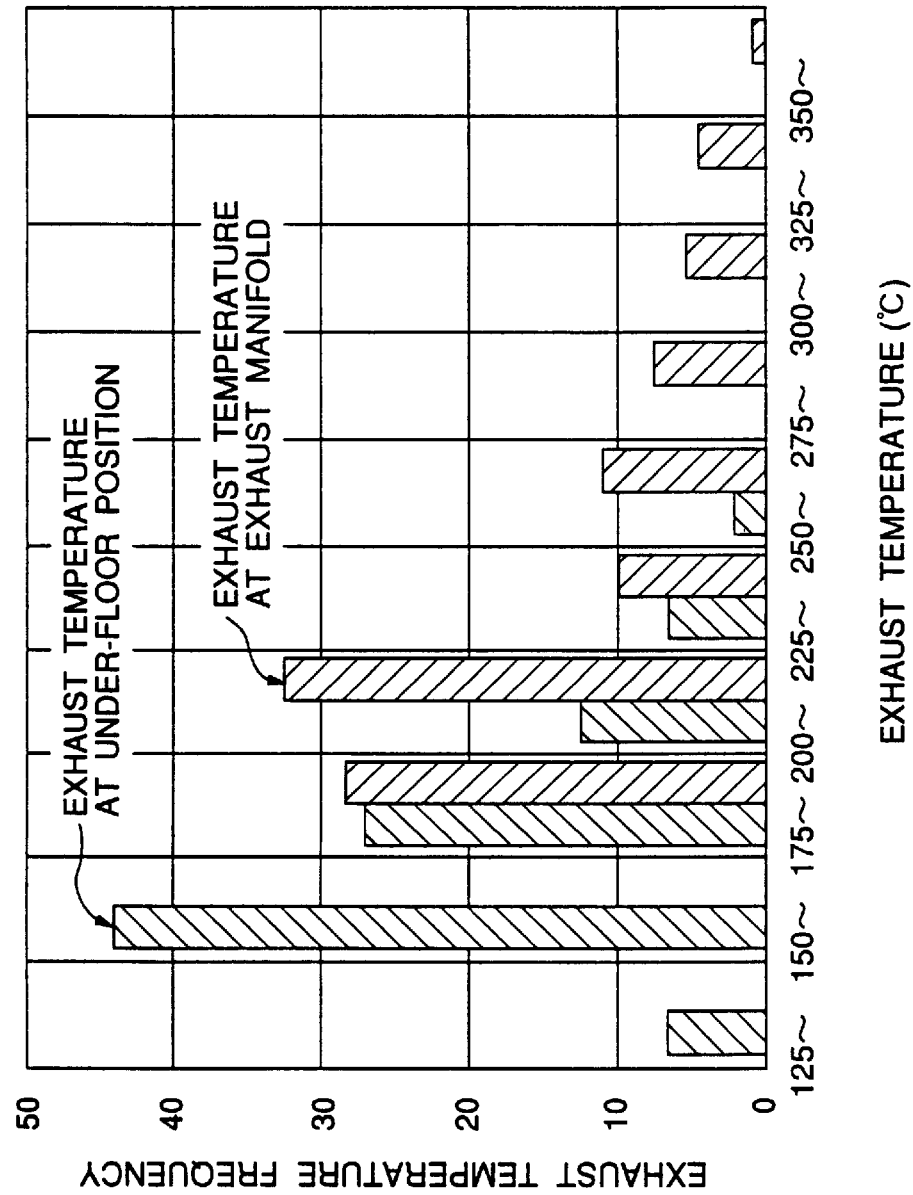
FIG. 14 is a graph showing exhaust temperature frequency when a vehicle carrying an ordinary direct injection type diesel engine is running in the 10/15 mode.
Figure 15A:
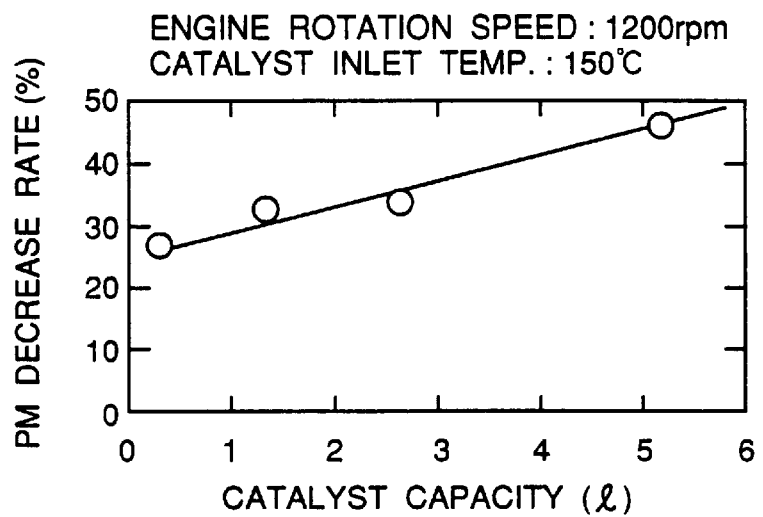
FIGS. 15A, 15B are graphs showing relations of a capacity of a Pt type oxidation catalyst to PM adsorption/build-up performance for the Pt type oxidation catalyst at an exhaust temperature of 150° C.
Figure 15B:
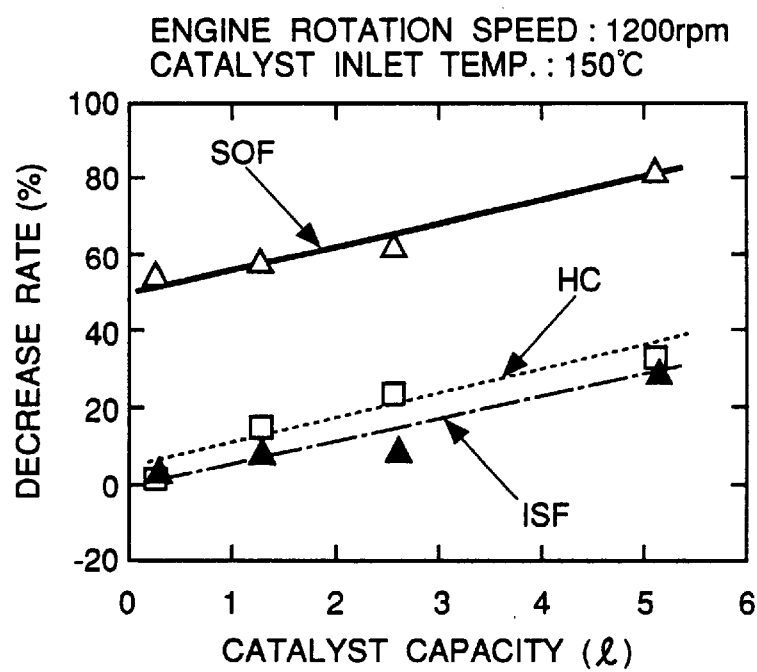
Figure 16A:
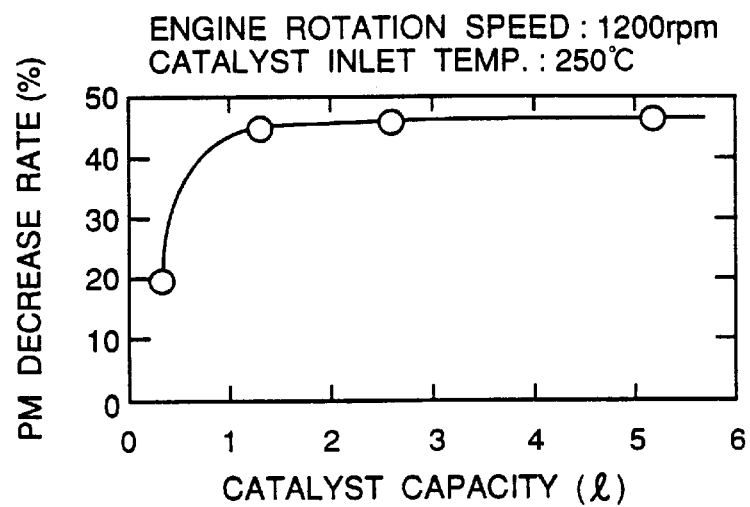
FIGS. 16A, 16B are graphs showing relations of a capacity of a Pt type oxidation catalyst to PM adsorption/build-up performance of the Pt type oxidation catalyst at an exhaust temperature of 250° C.
Figure 16B:
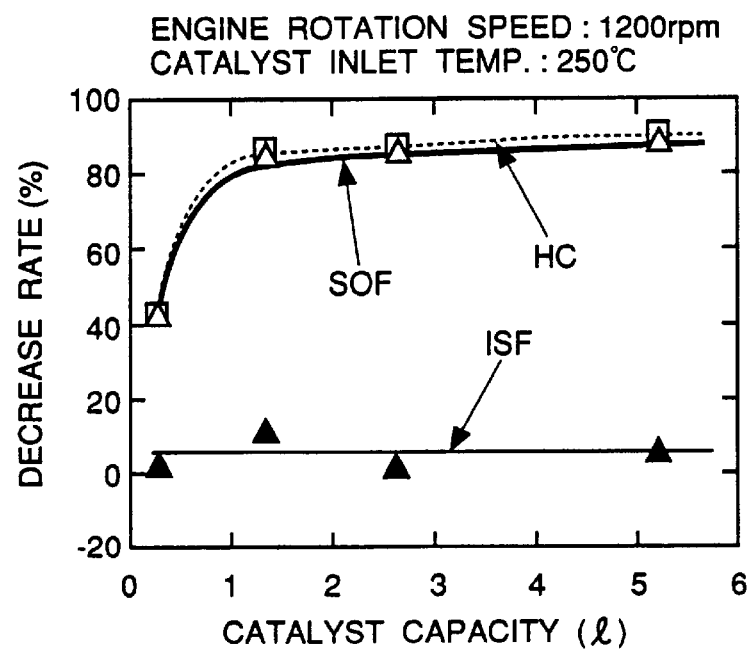
Figure 17A:
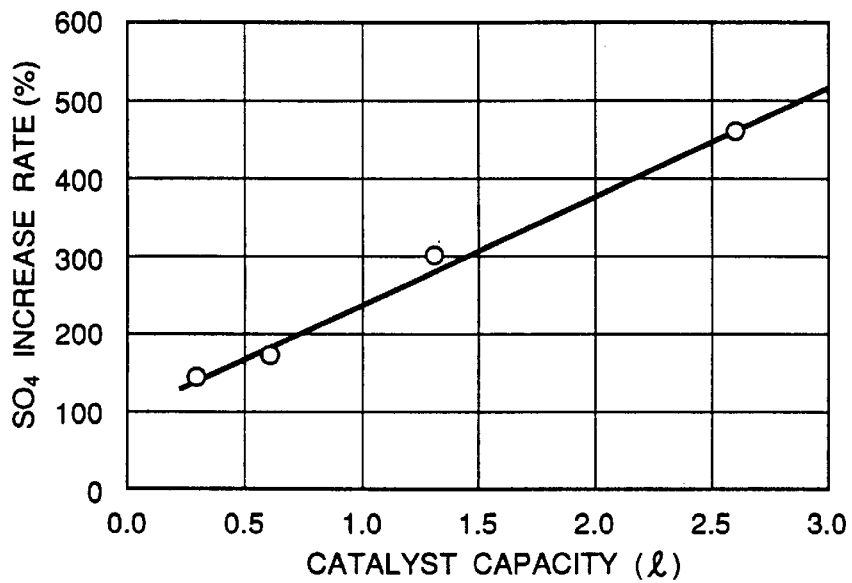
FIGS. 17A, 17B are graphs showing a relation of sulfate increase rate relative to catalyst capacity and space velocity (SV) in a Pt type oxidation catalyst.
Figure 17B:
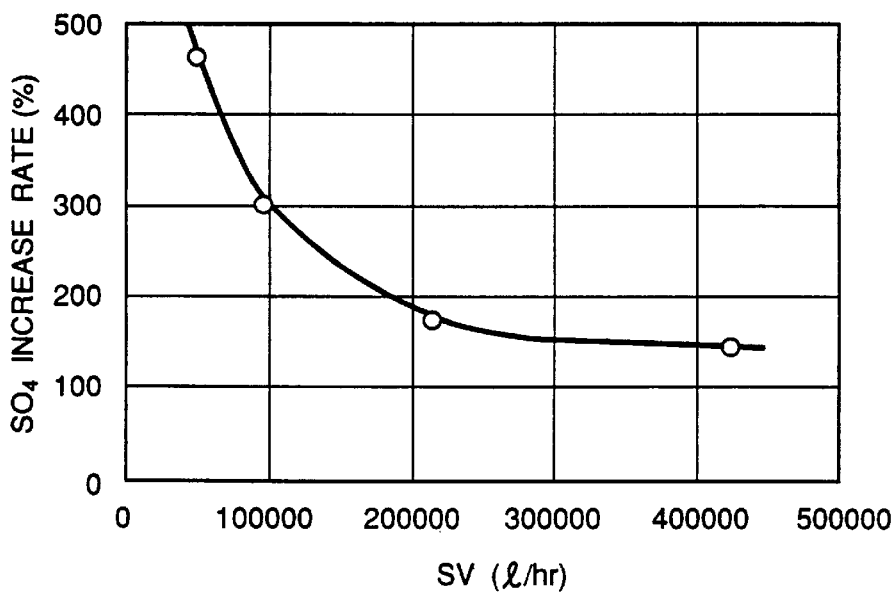

FIGS. 3A–3C show the relations between the inlet exhaust temperature, HC decrease rate, SOF and PM decrease rate and sulfate increase rate in a converter having the aforesaid construction. In these figures, data for a conventional oxidation catalyst are also shown. The catalyst converter according to this invention is a Pt type oxidation catalyst, however it has all the characteristics desired of a Pt type catalyst and Pd type catalyst shown in FIGS. 11A–11C. In other words the oxidizing activity with regard to HC and CO, and the decrease of SOF, are high, while the production of sulfate is suppressed. A desired PM decrease due to decrease of SOF is thus obtained even when the exhaust temperature is high.

Figure 4:
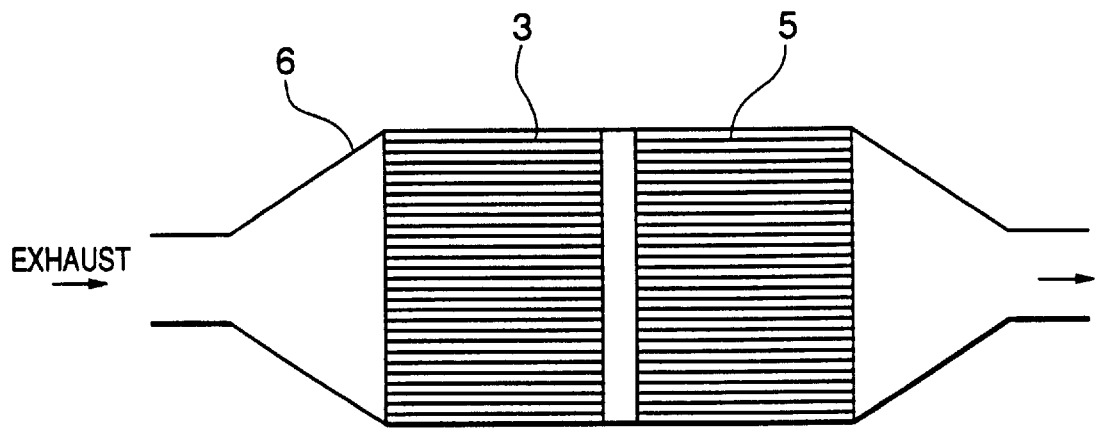
FIG. 4 is a schematic diagram of an oxidizing catalytic converter according to a second embodiment of this invention.

FIG. 4 shows a second embodiment of this invention.

In this embodiment, the upstream converter 3 and downstream converter 5 are installed in one case 6, an arrangement which is suitable when there is enough under-floor space available in the vehicle. As in the case of the first embodiment, the Pt particle diameter, wash coat support amount and Pt support amount are set according to the upstream and downstream exhaust temperatures. The arrows in the figures show the direction of the exhaust flow.

Figure 5:
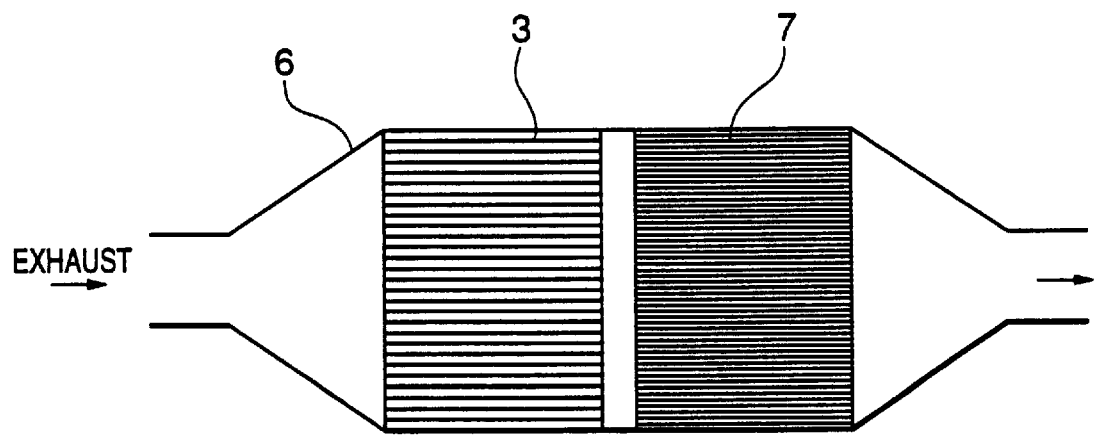
FIG. 5 is a schematic diagram of an oxidizing catalytic converter according to a third embodiment of this invention.

FIG. 5 shows a third embodiment of this invention.

Figure 6A:
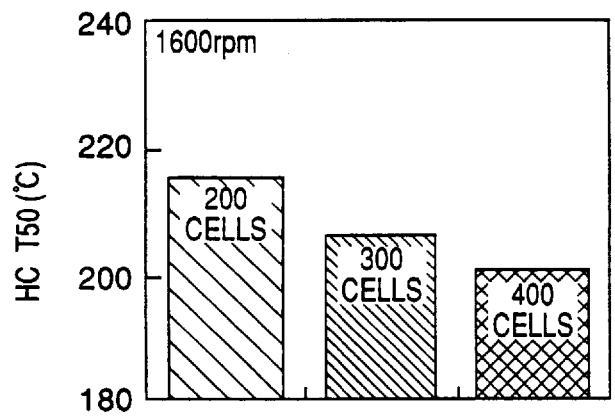
FIGS. 6A–6C are graphs showing relations between a cell number in an oxidizing catalytic converter, HC oxidizing activity, pressure difference before and after the catalyst, and decrease rates of PM and SOF.
Figure 6B:
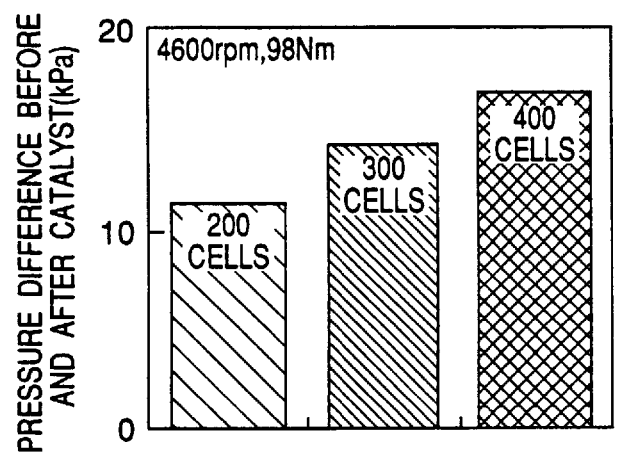
Figure 6C:
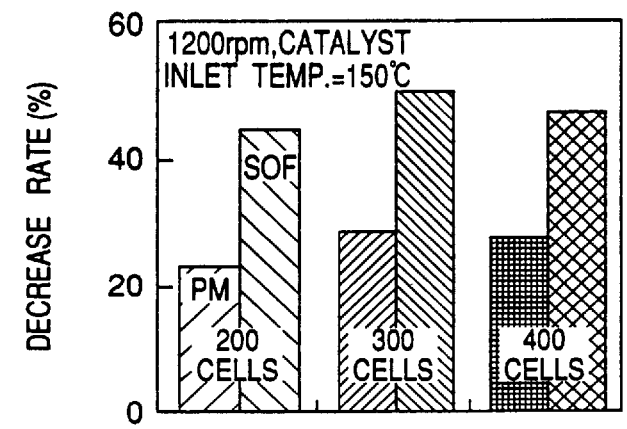

In addition to the construction of the second embodiment, according to this embodiment, the number of cells in the downstream converter 7 is increased in order to further improve the oxidizing activity. FIGS. 6A–6C show relations between the number of cells in the converter, oxidizing activity, pressure difference before and after the catalyst, and PM and SOF decrease rate. From these graphs it is seen that when the number of cells is increased, although the PM and SOF decrease rates are almost unchanged, the oxidizing activity is improved.

Figure 7:
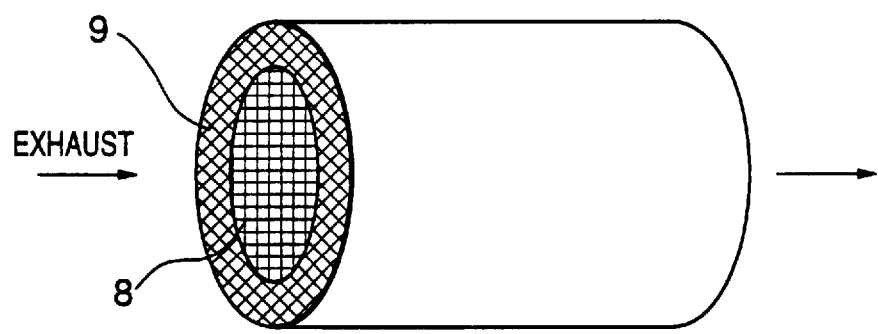
FIG. 7 is a schematic diagram of an oxidizing catalytic converter according to a fourth embodiment of this invention.

FIG. 7 shows a fourth embodiment of this invention.

Here, instead of separating the upstream and downstream converters, the structure of the catalyst is altered by having one converter separated into a central part 8 and a peripheral part 9. Specifically, the Pt particle diameter is made large, the wash coat amount is made large and the Pt amount is made rather small in the central part 8 of the catalyst where the average temperature is high. As a result, the adsorption/build-up at low temperature of SOF, and the release/oxidation at high temperature of SOF, proceed smoothly in a well-balanced manner.

However in a peripheral part 9 of the catalyst, the average temperature is as low as 50° C., and as it is at a high temperature for only a short time, there is a risk that SOF adsorbed at low temperature will be released as it is into the atmosphere without being oxidized at high temperature. For this reason, in the peripheral part 9, oxidizing activity is emphasized, hence the Pt particle diameter is set small, the wash coat amount is set small, and the Pt amount is set rather large. In this way, the decrease of PM (SOF) by the catalyst as a whole is enhanced.

When the substrate is of cordylite, such a structure may be implemented by making the converter case double. When the substrate is of metal, the structure may be implemented by manufacturing the catalysts separately, superposing them so as to form the arrangement of FIG. 7, and then joining them together on both end faces.

Figure 8:
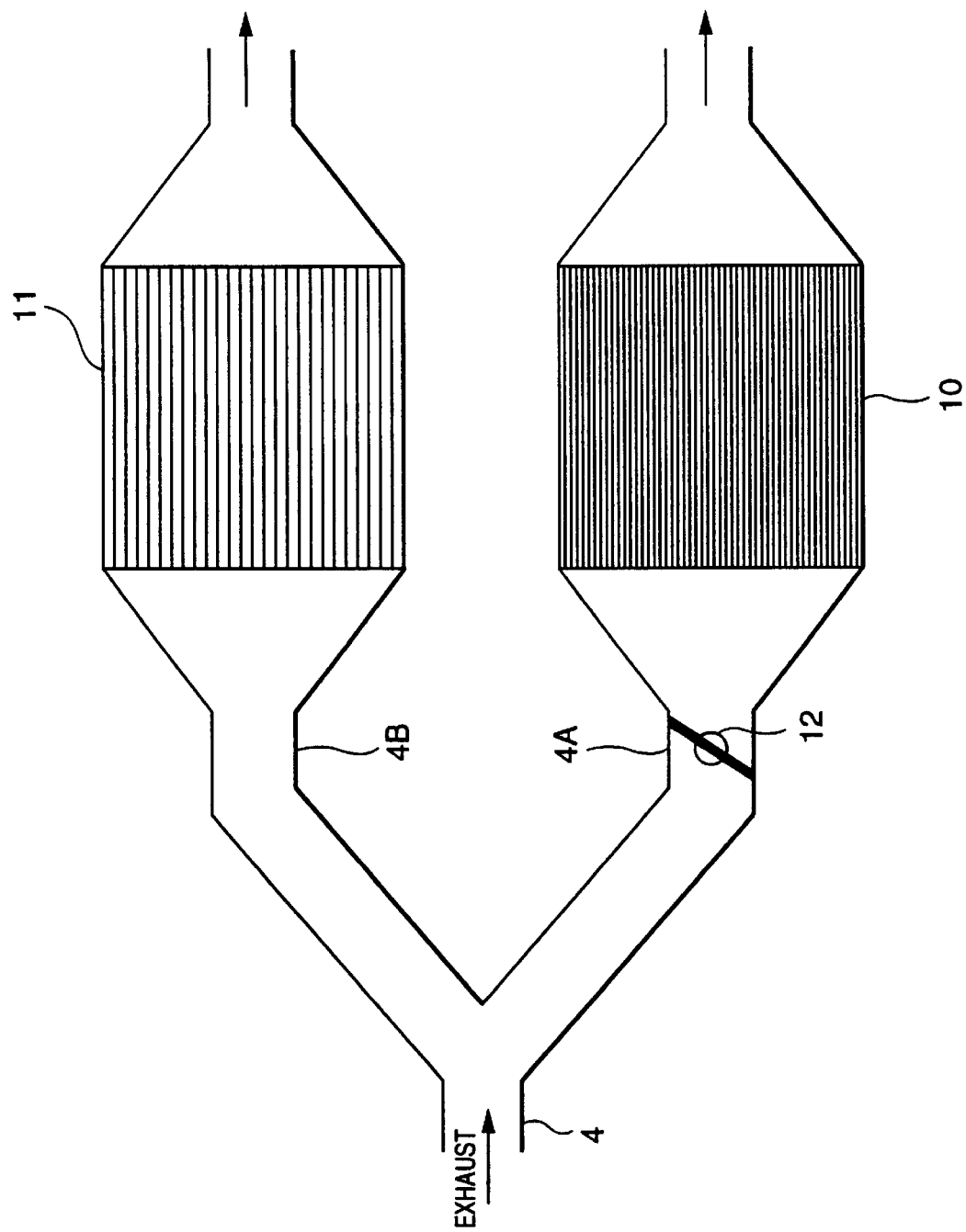
FIG. 8 is a schematic diagram of an oxidizing catalytic converter according to a fifth embodiment of this invention.
Figure 10:
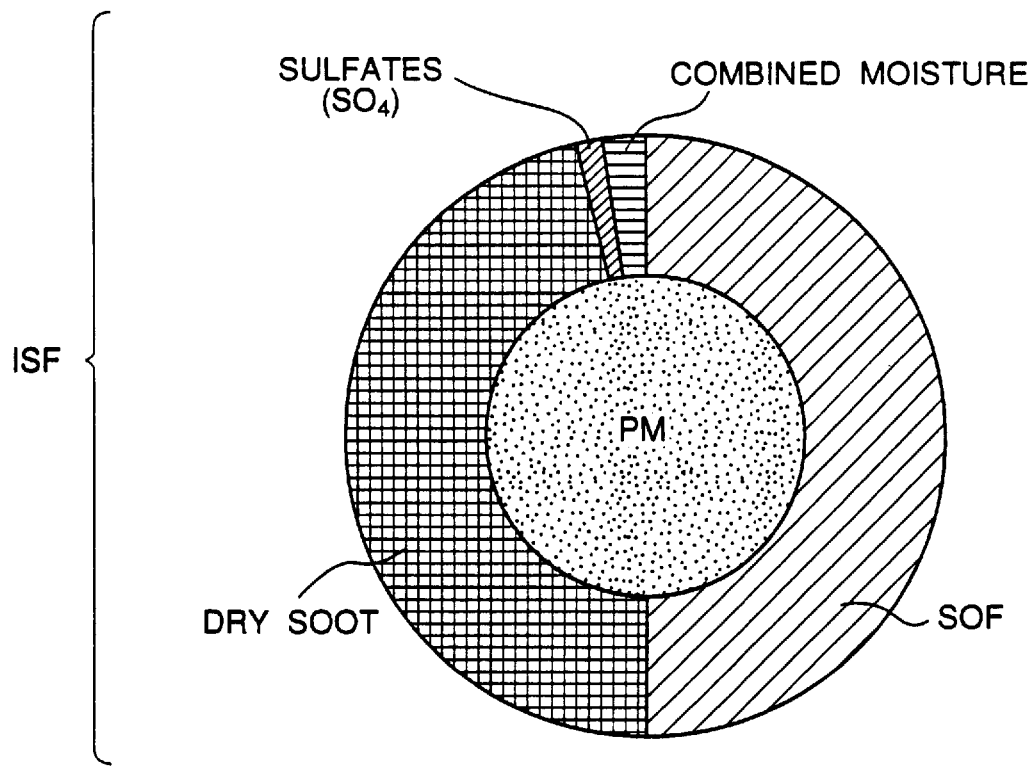
FIG. 10 is a pie chart showing components of exhaust particulate matter in ordinary diesel engine exhaust.

FIG. 8 shows a fifth embodiment of the invention.

According to this embodiment, two converters 10 and 11 are disposed parallel to branches 4A, 4B of the exhaust pipe 4. Exhaust is circulated through the converter 10 only when the exhaust temperature is equal to or less than a predetermined temperature, whereas it is circulated continuously through the other converter 11. A shutoff valve 12 is provided in the branch 4A of the exhaust pipe 4 for this purpose. As the converter 10 is used only at low temperature, there is no need to consider sulfate production. The Pt support amount per unit volume is therefore made larger and the Pt particle diameter made smaller in the oxidation catalyst of the converter 10 than in that of the converter 11. This enhances the oxidizing activity of the converter 10.

According to the aforesaid embodiment, the composition of the oxidation catalyst is varied depending on the exhaust temperature. The adjustment of components for the high temperature catalyst and low temperature catalyst will now be described in detail.

(1) High temperature oxidation catalyst—1 ($Pt/Al_2O_3$ catalyst)

Dinitrodiamine platinum solution was added to 1000 g of active alumina powder having γ-alumina as its main constituent. After stirring well, the mixture was dried in an oven at 150° C. for 3 hours, and calcinated at 800° C. for 4 hours so as to obtain a $Pt/Al_2O_3$ powder (A).

1000 g of this powder (A) and 1000 g of an alumina sol (obtained by adding 10 wt % $HNO_3$ to a 10 wt % suspension of boehmite alumina) were introduced into a ball mill pot, and crushed for 8 hours to give a slurry (B). The slurry (B) was coated onto a monolithic substrate base, and after drying, calcinated at 400° C. for 2 hours to give a catalyst (C).

The calcination of the powder (A) is usually performed at 400°–600° C., however the Pt particle diameter may be increased to 20 nm by calcination at 800° C.

The weight of the boehmite alumina is reduced to 60% by calcination, so 1000 g of the alumina sol becomes approximately 60 g after calcination.

The coating amount of the catalyst (C) is set at 120 g/l (when the Pt amount is 1–1.3 wt %) to 160 g/l (when the Pt amount is 0.75–1 wt %).

(2) High temperature oxidation catalyst—2 ($Pt/Al_2O_3+CeO_2$ catalyst)

700 g of the catalyst powder (A), 300 g of cerium oxide and 1000 g of the alumina sol were introduced into a ball mill pot, and crushed for 8 hours to give a slurry (D). The slurry (D) was coated onto a monolithic substrate base, and after drying, calcinated at 400° C. for 2 hours to give a catalyst (E).

The coating amount of the catalyst (E) is set at 120 g/l (when the Pt amount is 1–1.3 wt %) to 160 g/l (when the Pt amount is 0.75–1 wt %).

(3) High temperature oxidation catalyst—3 ($Rh/Pt/Al_2O_3$ catalyst)

The slurry (B) was coated onto a monolithic substrate base, and after drying, calcinated at 400° C. for 2 hours so as to give the catalyst (C). The coating amount of catalyst was 100–130 g/l.

Next, rhodium nitrate solution was added to 1000 g of active alumina powder having γ-alumina as its main constituent so that the amount of Rh was 1 wt %. After stirring well, the mixture was dried in an oven at 150° C. for 3 hours, and calcinated at 800° C. for 4 hours so as to obtain a $Rh/Al_2O_3$ powder (F).

1000 g of this powder (F) and 1000 g of the alumina sol were introduced into a ball mill pot, and crushed for 8 hours to give a slurry (G).

The slurry (G) was coated onto a monolithic substrate base which had already been coated with $Pt/Al_2O_3$, and after drying, calcinated at 400° C. for 2 hours to give a catalyst (H). The coating amount of this catalyst was set at 20–30 g/l.

The total catalyst coating amount (E) is set at 120 g/l (when the Pt amount is 1–1.3 wt %) to 160 g/l (when the Pt amount is 0.75–1 wt %).

(4) High temperature oxidation catalyst—4 ($Pt/Al_2O_3+Pt/CeO_2$ catalyst)

Dinitrodiamine platinum solution was added to cerium oxide powder in such a proportion that the Pt amount was 1.5 wt %. After stirring well, the mixture was dried in an oven at 150° C. for 3 hours, and calcinated at 800° C. for 4 hours so as to obtain a $Pt/CeO_2$ catalyst powder (I).

300 g of this powder (I), 700 g of the powder (A) and 1000 g of the alumina sol were introduced into a ball mill pot, and crushed for 8 hours to give a slurry (J).

The slurry (J) was coated onto a monolithic substrate base, and after drying, calcinated at 400° C. for 2 hours to give a catalyst (K).

The coating amount of the catalyst (K) is set at 120 g/l (when the Pt amount is 1–1.3 wt %) to 160 g/l (when the Pt amount is 0.75–1 wt %).

(5) Low temperature oxidation catalyst—1 ($Pt/Al_2O_3$ catalyst)

Dinitrodiamine platinum solution was added to 1000 g of active alumina powder having γ-alumina as its main constituent. After stirring well, the mixture was dried in an oven at 150° C. for 3 hours, and calcinated at 400° C. for 4 hours so as to obtain a $Pt/Al_2O_3$ powder (L).

1000 g of this powder (A) and 1000 g of an alumina sol (obtained by adding 10 wt % $HNO_3$ to a 10 wt % suspension of boehmite alumina) were introduced into a ball mill pot, and crushed for 8 hours to give a slurry (M). The slurry (M) was coated onto a monolithic substrate base, and after drying, calcinated at 400° C. for 2 hours to give a catalyst (N).

By setting the calcination temperature to 400° C., the Pt particle diameter is steady at approximately 2 nm.

The coating amount of the catalyst (N) is set at 10 g/l (when the Pt amount is 16–20 wt %) to 30 g/l (when the Pt amount is 5–7 wt %).

(6) Low temperature oxidation catalyst—2 ($Pt/Al_2O_3+CeO_2$ catalyst)

700 g of the catalyst powder (L), 400 g of cerium oxide and 1000 g of the alumina sol were introduced into a ball mill pot, and crushed for 8 hours to give a slurry (O). The slurry (O) was coated onto a monolithic substrate base, and after drying, calcinated at 400° C. for 2 hours to give a catalyst (P).

The coating amount of the catalyst (P) is set at 10 g/l (when the Pt amount is 16–20 wt %) to 30 g/l (when the Pt amount is 5–7 wt %).

(7) Low temperature oxidation catalyst—3 ($Rh/Pt/Al_2O_3$ catalyst)

The slurry (M) was coated onto a monolithic substrate base, and after drying, calcinated at 400° C. for 2 hours so as to give the catalyst (N). The coating amount of catalyst was 9–27 g/l.

Next, rhodium nitrate solution was added to 1000 g of active alumina powder having γ-alumina as its main constituent so that the amount of Rh was 1 wt %. After stirring well, the mixture was dried in an oven at 150° C. for 3 hours, and calcinated at 400° C. for 4 hours so as to obtain a $Rh/Al_2O_3$ powder (Q).

1000 g of this powder (Q) and 1000 g of the alumina sol were introduced into a ball mill pot, and crushed for 8 hours to give a slurry (R).

The slurry (R) was coated onto a monolithic substrate base which had already been coated with $Pt/Al_2O_3$, and after drying, calcinated at 400° C. for 2 hours to give a catalyst (S).

The total catalyst coating amount is set at 10 g/l (when the Pt amount is 16–20 wt %) to 30 g/l (when the Pt amount is 5–7 wt %).

(8) Low temperature oxidation catalyst—4 ($Pt/Al_2O_3+Pt/CeO_2$ catalyst)

Dinitrodiamine platinum solution was added to cerium oxide powder in such a proportion that the Pt amount was 1.5 wt %. After stirring well, the mixture was dried in an oven at 150° C. for 3 hours, and calcinated at 400° C. for 4 hours so as to obtain a $Pt/CeO_2$ catalyst powder (T).

300 g of this powder (T), 700 g of the powder (L) and 1000 g of the alumina sol were introduced into a ball mill pot, and crushed for 8 hours to give a slurry (U).

The slurry (U) was coated onto a monolithic substrate base, and after drying, calcinated at 400° C. for 2 hours to give a catalyst (V).

The coating amount of the catalyst (V) is set at from 10 g/l (when the Pt amount is 16–20 wt %) to 30 g/l (when the Pt amount is 5–7 wt %).

The above are typical preparations of the diesel engine oxidation catalyst. Durability and low temperature activity performance may be enhanced by adding $CeO_2$ or Rh to $Pt/Al_2O_3$. The aforesaid catalysts may also be combined with Pd or $ZrO_2$ which are commonly used as oxidation catalysts.

The embodiments of this invention in which an exclusive property or privilege is claimed are defined as follows:

1. An oxidizing catalytic converter installed in an exhaust passage of a diesel engine comprising:

a catalyst comprising a substrate and a washcoat coated thereon, said washcoat including platinum particles, said catalyst comprising a first part through which exhaust having a first temperature is circulated and a second part through which exhaust having a second temperature lower than said first temperature is circulated, wherein a diameter of the platinum articles in the washcoat in said second part is less than a diameter of the platinum articles in the washcoat in said first part.

2. An oxidizing catalytic converter as defined in claim 1, wherein the diameter of the platinum particle in the washcoat in said second part is 2–4 nm and the diameter of the platinum particle in the washcoat in said first part is approximately 20 nm.

3. An oxidizing catalytic converter as defined in claim 1, wherein an amount of the wash coat per unit catalyst volume in said second part is set less than an amount of the washcoat per unit catalyst volume in said first part.

4. An oxidizing catalytic converter as defined in claim 3, wherein an amount of the wash coat per unit catalyst volume in said second part is 10–30 g/l and an amount of the washcoat per unit catalyst volume in said first part is 120–160 g/l.

5. An oxidizing catalytic converter as defined in claim 1, wherein a platinum particle amount per unit catalyst volume in said second part is set larger than a platinum particle amount per unit catalyst volume in said first part.

6. An oxidizing catalytic converter as defined in claim 5, wherein the platinum particle amount per unit catalyst volume in said second part is 1.6–2.0 g/l, and the platinum particle amount per unit catalyst volume in said first part is 1.2–1.6 g/l.

7. An oxidizing catalytic converter as defined in claim 1, wherein said first part is situated upstream of an exhaust passage relative to said second part.

8. An oxidizing catalytic converter as defined in claim 7, wherein said first part and said second part are disposed in series in one case.

9. An oxidizing catalytic converter as defined in claim 1, wherein said substrate is formed in the shape of an envelope, and wherein said first part is disposed in the vicinity of the center of the substrate, and said second part is disposed in the periphery of said substrate.

10. An oxidizing catalytic converter as defined in claim 1, including an exhaust passage which comprises a first branch and a second branch, said first part is disposed in said second branch, said second part is disposed in said first branch, and said converter further comprises a shutoff valve provided upstream of said second part in said first branch and which opens only when the exhaust temperature is lower than a predetermined value.

11. An oxidizing catalytic converter as defined in claim 1, wherein said first part and said second part respectively comprise a plurality of cells, and the number of cells in said second part is greater than the number of cells in said first part.

* * * * *